United States Patent [19]

Pateras Pescara de Castelluccio

[11] Patent Number: 4,599,889
[45] Date of Patent: Jul. 15, 1986

[54] APPARATUS FOR MEASURING THE REAL EVAPOTRANSPIRATION OF A PLANT COVER, FOR MEASURING THE AMOUNT OF CARBON DIOXIDE EXCHANGED BETWEEN SAID PLANT COVER AND THE ATMOSPHERE AND FOR MEASURING THE HYDROUS STATE OF THE GROUND AROUND THE PLANT COVER

[75] Inventor: Christian Pateras Pescara de Castelluccio, Pau, France

[73] Assignee: S.A.R.L. Dite Industrielle Francaise de Mecanique Flambeau, Bizanos, France

[21] Appl. No.: 435,471

[22] Filed: Oct. 20, 1982

[30] Foreign Application Priority Data

Oct. 20, 1981 [FR] France ................. 81 19998

[51] Int. Cl.⁴ ............................................ G01N 25/62
[52] U.S. Cl. .................................. 73/23; 73/338.6; 47/58
[58] Field of Search ............ 73/23, 29, 338, 338.6; 374/138; 47/17, 58

[56] References Cited

U.S. PATENT DOCUMENTS

| | | | |
|---|---|---|---|
| 2,095,237 | 10/1937 | Brooks et al. | 73/338.6 |
| 2,900,821 | 8/1959 | Rich | 374/138 |
| 2,915,898 | 12/1959 | Van Luik, Jr. | 73/29 |
| 3,381,409 | 5/1968 | Lamont | 73/23 |

FOREIGN PATENT DOCUMENTS

2460475  1/1981  France.

OTHER PUBLICATIONS

D. S. Munro, "A Portable Differential Psychrometer System", *Journal of Applied Meteorology*, vol. 19, No. 2, pp. 206–214, Feb. 1980.

G. S. Campbell, "Improved Thermocouple Psychrometers for Meas. of Soil Water Pot. in Temp. Grad.", *J. Phys. E. Sci. Instr.*, vol. 12, No. 8, pp. 739–743, Aug. 1979.

"Revised Guidelines for Reporting Studies in Controlled Environ. Chambers", Hort Science, vol. 12(4), pp. 309–310, Aug. 1977.

*Primary Examiner*—Stephen A. Kreitman
*Attorney, Agent, or Firm*—Sandler & Greenblum

[57] ABSTRACT

Apparatus for measuring the real evapotranspiration of a plant cover, for measuring the amount of carbon dioxide exchanged between said plant cover and the atmosphere and for measuring the hydrous state of the ground around the plant cover. The apparatus includes an assembly of terminals, an electronic command and calculation unit, and a unit to store the results calculated by the electronic command and calculation unit. The apparatus permits the calculation of the evapotranspiration by the application of any one of the Bowen ratio method, the simplified direct aerodynamic method, or the simplified combined aerodynamic method.

14 Claims, 19 Drawing Figures

APPARATUS FOR MEASURING THE REAL EVAPOTRANSPIRATION OF A PLANT COVER, FOR MEASURING THE AMOUNT OF CARBON DIOXIDE EXCHANGED BETWEEN SAID PLANT COVER AND THE ATMOSPHERE AND FOR MEASURING THE HYDROUS STATE OF THE GROUND AROUND THE PLANT COVER

BACKGROUND OF THE INVENTION

1. Field of the Invention

The present invention relates to an apparatus which includes a variety of assemblages which enable the apparatus to determine in situ the real evapotranspiration of a plant cover, such as cultivated land. The apparatus is also capable of determining the carbon dioxide exchange between the cultivated land and the atmosphere. Finally, the apparatus of the invention enables one to measure the hydrous state (moisture content) of the ground around the irrigated land.

2. Description of Material Information

In attempting to determine the biological status and needs of a plant cover, such as a farmed surface, it is necessary to monitor various environmental parameters, such that remedial action can be taken to maintain the farmland in peak condition. Among the environmental parameters that are important are the net water loss (evapotranspiration) of the ground cover (crop) to the atmosphere, the net exchange of carbon dioxide, and the hydrous state of the ground. In particular, the study of the evapotranspiration of cultivated land allows one to determine the water needs of the land, as well as the biochemical status of the particular vegetation involved.

In calculating the value of the evapotranspiration, it is known to apply the Bowen ratio method. This method consists in determining the net radiation, the conduction flux in the ground, and the differences of dry and wet bulb temperatures at two levels above the plant cover.

French patent application No. 79 17306 (now French Pat. No. 2,460,475), by the present Applicant, discloses an automatic evapotranspiration measuring apparatus which makes possible the use of the Bowen ratio method.

A second method of measuring the real evapotranspiration of a plant cover is known as the simplified combined aerodynamic method. The application of this method requires that the real evapotranspiration be calculated from the net radiation measure, the flux of the ground heat, the gradient of the temperature in the air, and the speed of the wind above the plant cover.

SUMMARY OF THE INVENTION

It is an object of the invention to provide an apparatus capable of measuring the net or real evapotranspiration by what is called the simplified direct aerodynamic method, in addition to the Bowen ratio method and the simplified combined aerodynamic method.

In the calculation of the real evapotranspiration of a plant cover, it has been found advantageous to use what is termed "the simplified direct aerodynamic method", as opposed to the Bowen ratio method or the simplified combined aerodynamic method, discussed above. In the application of this method, the net evapotranspiration of a plant cover is calculated from the difference of the dry and wet bulb temperatures, and from the wind speed at two levels above the plant cover.

The present invention describes an apparatus for measuring the net evapotranspiration of a plant cover by the application of this simplified direct aerodynamic method.

Advantageously, the apparatus of the present invention is capable of determining the net evapotranspiration of a plant cover from the simplified direct aerodynamic method, or from either of the other two methods described above in the Description of the Prior Art. The particular method to be used is to be determined by the characteristics of the measuring site.

Accordingly, the apparatus of the present invention comprises a plurality of terminals, including thermodifferentials, anemometers, psychrometers, air terminals, pradiometers, fluxmeters, rain gauges, and probes for measuring the ground temperature, including the air temperature on the ground, and the ground surface temperature.

The apparatus is also equipped with an electronic control and calculation unit for measuring the net evapotranspiration, for measuring the amount of carbon dioxide exchange, and for measuring the value of the hydrous state of the ground, all from signals as transmitted by the above enumerated terminals.

The apparatus further includes a storage unit with means for calculating values. The storage unit contains the controlling programs of the unit. The apparatus further comprises at least one frame having an inverted chassis on which are located the anemometers, the thermodifferentials and the psychrometers.

The thermodifferentials each comprise a means of articulation around a vertical axis, a means of orienting the thermodifferential into the wind's eye, a protective outside housing to reflect solar radiation, an air entry pipe located in the front section of the housing and separated from this by rings, a system of thermal insulation of the air entry pipe, in relation to the housing, and at least one means of temperature recording located on an attachment organ and placed behind the air entry pipe. Each terminal further has at least one ventilation system.

According to another characteristic of the invention, each psychrometer is equipped with a moistening apparatus. The moistening apparatus comprises a moist probe which includes a wick soaking in water drawn from two lateral reservoirs. The apparatus is further equipped with a means to limit the quantity of water drawn by the wick, thus avoiding dripping of the liquid in the principal pipe of the psychrometer.

BRIEF DESCRIPTION OF THE DRAWINGS

The above objects, features and advantages of the present invention will be more fully apparent to those of ordinary skill in the art to which this invention pertains from the following detailed description, when considered in connection with the accompanying drawings, wherein.

DETAILED DESCRIPTION

It is frequently desirable to calculate the value of the real evapotranspiration, or water loss to the atmosphere, from a specified plant or ground cover, such as cultivated land. In calculating the real evapotranspiration, one can use one of two methods: the Bowen ratio method, or the simplified combined aerodynamic method. A third method is also proposed. The method is known as the simplified direct aerodynamic method. Each of these methods requires the input of information on various environmental parameters, so that the real evapotranspiration of the ground cover can be determined.

The Bowen ratio method requires the determination of the net radiation, the conduction flux in the ground, and the differences of dry and wet bulb temperatures at two levels above the plant cover.

The simplified combined aerodynamic method requires the measurement of the net radiation, the flux of the ground heat, and the air temperature gradient, as well as the speed of the wind above the plant cover.

The newly proposed simplified direct aerodynamic method requires the measurement of the difference of the dry and wet bulb temperatures, and the wind speed at two levels above the plant cover.

Figure 1:
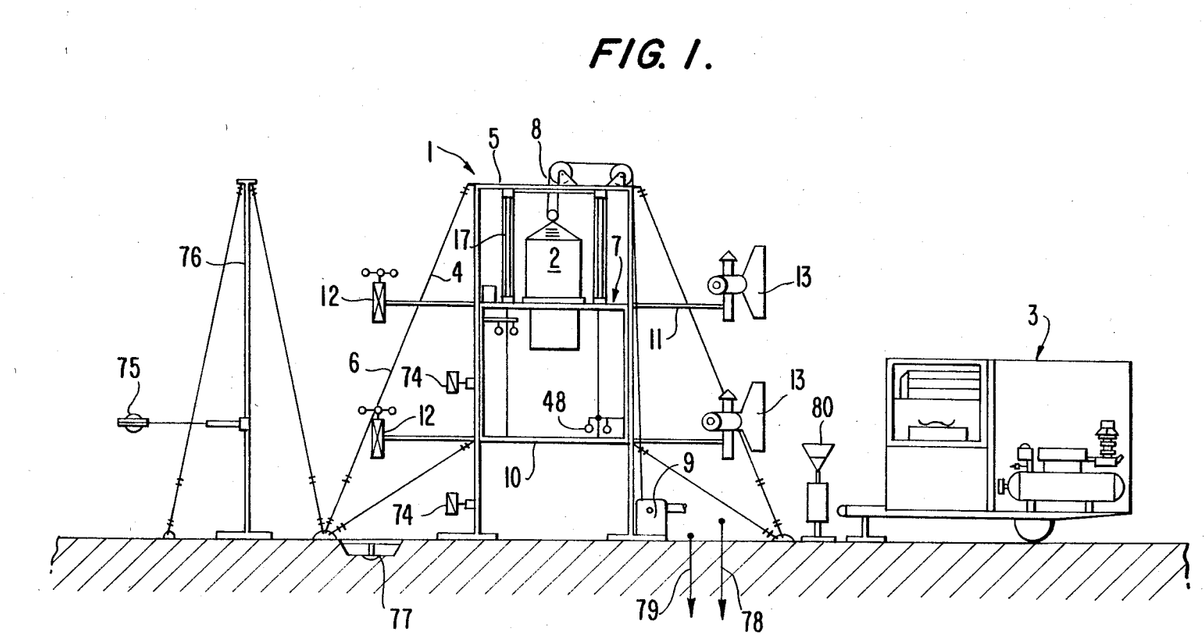
FIG. 1 is a view of the aggregate of the apparatus according to the invention.

As shown in FIG. 1, an apparatus according to the present invention for the in situ determination of the net evapotranspiration of a plant cover is shown. Any one of the three above-discussed methods may be used in conjunction with the apparatus of the invention for the determination of the net evapotranspiration.

With reference to FIG. 1, the apparatus comprises at least one frame 1 which can be dismantled, an aggregate of terminals, each affected by the measure of an intervening parameter in the evapotranspiration calculation, an evapotranspiration calculation unit 2, capable of determining the net evapotranspiration from the value supplied by the terminals, and a management and storage unit 3 for the facts submitted by unit 2.

Frame 1 is held on the measuring site by several guy wires 6 anchored in the ground, and is equipped as is known with means of tension implementation.

Frame 1 is comprised of 2 vertical wires each equipped with a base and joined at the top by horizontal cross-bar 5. Between vertical wires 4 and in the plane of the frame is placed chassis 7 whose height in relation to the ground or in relation to the vegetation is adjustable. The chassis is adjustable by virtue of the fact that it is suspended from a cable 8 which cooperates with winch 9, which comprises a sliding means in relation to wires 4.

Chassis 7 comprises at least two lower horizontal cross-bars 10 and two upper cross-bars 11 separated by vertical struts.

Crossbars 10 and 11 are lenghtened towards the end of the frame on either end of it, with a view in mind of placing thereon, at different levels, two series of terminals comprising anemometers 12 and thermodifferentials 13, respectively affected by the measure of the wind speed and by the measure of the air temperatures above the plant cover.

As can be seen with reference to FIG. 1, at each level there is attached anemometer 12 and thermodifferential 13, respectively, on the ends of one of the cross-bars of chassis 7. These devices can be dismantled from the chassis.

The apparatus is preferably equipped with two measuring levels, a lower level ZO and an upper level $ZO + \Delta Z$. The level ZO corresponds to the distance between the ground and the lower terminals.

As indicated above, the value of the distance ZO can be regulated and adjusted to the height of the plant cover by traction on cable 8 with the help of winch 9.

The value $\Delta Z$ corresponds to the distance between two terminals of the same type, as for example, the two anemometers, or the two thermodifferentials. This distance can be adjusted by moving the terminals in relation to their attachment point on crossbars 10 and 11. It will be readily apparent to those skilled in the art that other means are also available for adjusting the distance $\Delta Z$. For example, chassis 7 may be equipped with telescopic struts to separate crossbars 10 and 11 or to bring them closer together.

By way of example, and without intending to limit the scope of this invention in any way, the value of ZO can be between 50 and 75 centimeters, while the value $ZO + \Delta Z$ can be between 2 meters and 2.25 meters.

As shown in FIG. 1, the anemometers 12 of a known type are vertically located on the extension of both crossbars and are on the same side of frame 1.

At low wind speeds, for example, less than 0.5 meters per second, the anemometers are inoperable. The apparatus is, therefore, provided with a measuring system comprising a high precision resistance with an additional means for measuring the temperature of the resistance. This resistance element is crossed by a continuous, constant current delivered by an electronic means known to the art. By comparing the temperature of the resistance and that of the ambient air, the value of the wind speed can be deduced. This system is protected from solar radiation and from other atmospheric influences by a protective shell, or other means known to the art.

The thermodifferentials are located on the other side of the frame, one above the other, and can pivot around a vertical axis to orient themselves in the eye of the wind. For this purpose, and as shown by FIG. 2, each terminal 13 has vertical pivot 14 cooperating with rolling elements 15 located in housings 16 located on the end of the horizontal cross bar 10 or 11, and vertical center board 17.

Figure 2:
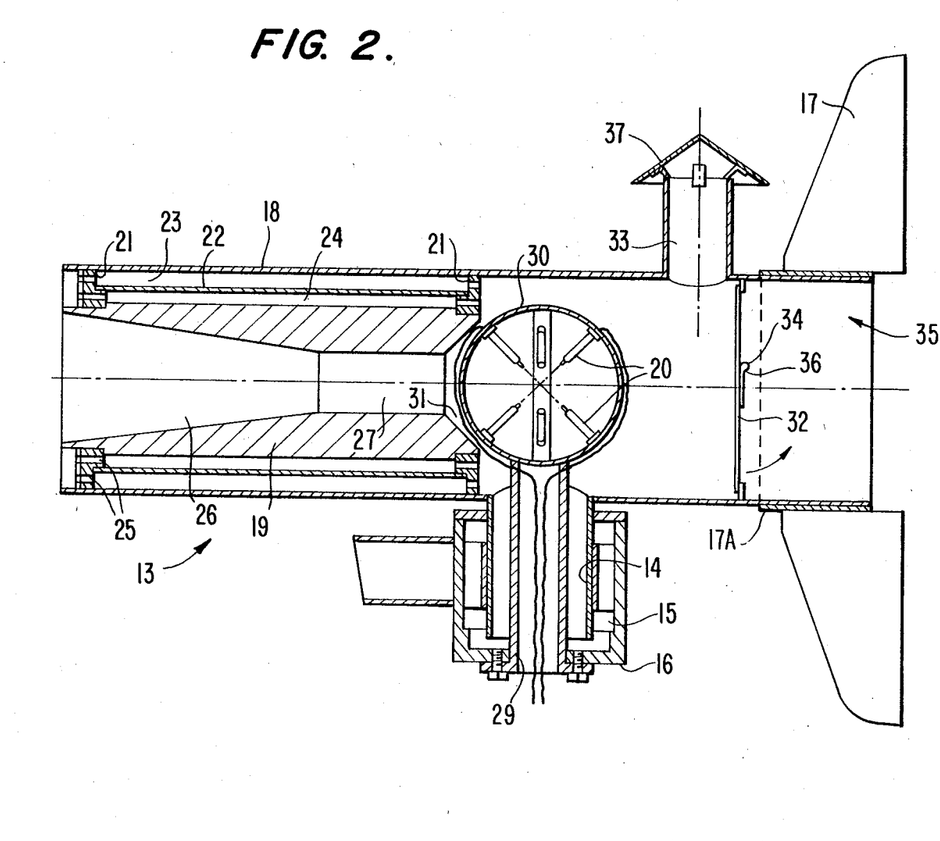
FIG. 2 is a longitudinal cross-section of a thermodifferential.

As represented in FIG. 2, thermodifferential 13 comprises horizontal protective outside envelope 18, air entry pipe 19 located in front of the envelope, and means 20 for temperature recording, located in the extension of the pipe inside the envelope. The thermodifferential is also provided with at least one ventilation system.

Envelope 18 of the thermodifferential is provided in the shape of a cylindrical tubular element and is made of or covered with, a material which reflects solar radiation, so as to avoid a tightening effect inside thermodifferential 13, which would be detrimental to a correct measure of the air temperature. It is preferable that the envelope 18 be made of polished stainless steel or of lightly alloyed steel covered with a layer of chrome.

Located prominently in the median zone of the envelope 18 there is attached vertical pivot 14. The back part of the pivot receives center board 17 which has, as shown by FIG. 2, band 17a attached to the envelope.

Air entry pipe 19, which is coaxial to the envelope, is held apart from the envelope by at least two rings 21 of synthetic material. These rings are located at each end of pipe 19 against the shoulder, and are connected to the envelope by attachment means, for example, by snap rings.

A thermal insulating means is located between envelope 18 and pipe 19. This thermal insulation means preferably comprises tubular element 22 coaxial to the envelope and to said pipe. As can be seen with reference to FIG. 2, this element is engaged by its ends on a shouldered surface of rings and is connected to this by any means known to those skilled in the art.

Tubular element 22 defines with the envelope a first chamber 23, and with the pipe a second chamber 24. Orifices 25 are pierced through the rings transversally to the rings. This ensures the free circulation of air in the two chambers and puts the chambers in communication with the outside environment of terminal 13, and with the inside of the envelope located behind the pipe. This arrangement has as its goal to ensure the thermal insulation of pipe 19 by surrounding it with two layers of air separated by element 22. Due to this fact, the air collected by the pipe does not undergo any thermal variation inside thermodifferential 13 before its temperature is measured.

For reasons previously stated, pipe 19 is advantageously made of synthetic material, as for example, TEFLON (TM). The pipe has two orifices 26 and 27 coaxial to the pipe, one opening into the other. Orifice 26 positioned in front of the pipe is conical and shrinks inward up to the mouth or orifice 27, which is preferably cylindrical. This arrangement has as its goal the channelization of the air entering pipe 19 onto the temperature recording means 20.

By way of example, and without limiting the scope of the present invention, the angle of the frustrum of the cone formed by orifice 26 is between 16° and 20°. The temperature means is located behind pipe 19 in the extension of orifice 27, and is placed on support 28 interdependent with housing 16. This support comprises vertical tube 29 and an attachment organ of temperature recording means 20.

Vertical tube 29 is engaged in pivot 14 and is interdependent with housing 16. In vertical tube 29 there is engaged the cable of means 20. This particular assemblage avoids twisting of the cable of temperature measuring means 20 when terminal 13 starts to rotate under the effect of wind pressure.

As can be seen, terminal 13 is equipped with several temperature recording means 20 regularly placed inside the envelope and behind orifice 27 so that the orientation of the terminal does not have any influence on the recording of the air temperature.

It is preferable that terminal 13 be equipped with eight means 20 located on the attachment organ comprising two rings 30 of the same diameter, perpendicular to each other and inscribed in a sphere. These rings are attached to each other at the end of tube 29 in grooves located in this tube. Each ring comprises a series of orifices regularly placed, each receiving means 20. As can be seen in FIG. 2, these means are radial to the rings and are directed towards the center of these rings.

To disengage the passage of pipe 19 during the rotation of terminal 13, so that it does not come into contact with rings 30, disengagement orifice 31 is located behind orifice 27.

According to a preferred method of the invention, temperature recording means 20 comprises a platinum probe or a thermocouple.

To measure the difference of the two temperatures of air taken respectively by the two terminals 13 (i.e., the variation of air temperature between the level ZO and the level ZO+$\Delta$Z), means 20 of the two terminals are electrically connected and are positioned in series.

Figure 4:
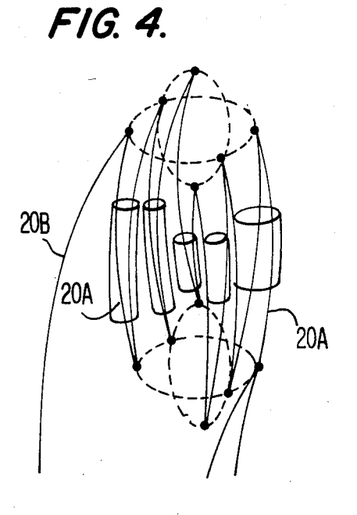
FIG. 4 is a view of the thermo-couple network.

As can be seen in FIG. 4, the thermocouple network is comprised of an alternate series of two elements 20A and 20B which are very long and are wires of different materials welded end to end.

On the outside of the terminals these elements are located in a protective sheet which is rot-resistant, and is equipped with a ground.

To avoid any variation in air temperature at the level of the temperature recording means, each terminal 13 is equipped with at least one ventilation system. According to a preferred embodiment, the terminal is equipped with two ventilation systems, each respectively comprising a movable shutter 32 located in envelope 18, and a chimney 33.

Figure 3:
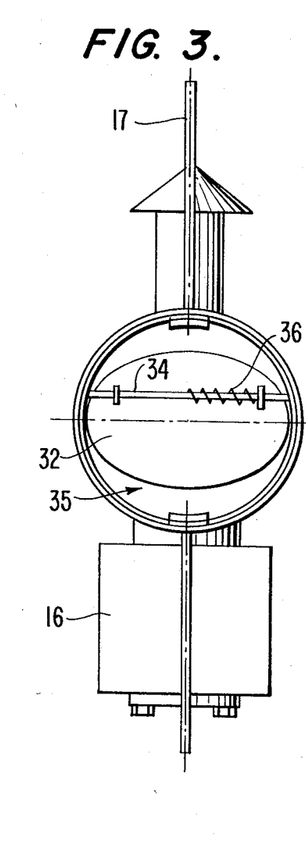
FIG. 3 is a back view according to FIG. 2.

As illustrated in FIGS. 2 and 3, movable shutter 32 is articuated with axis 34 transversal to the envelope behind one or more means 20. In its original position, the shutter obstructs rear orifice 35 of envelope 18.

When the wind speed is equal to or greater than, for example, 3 m/s, the movable shutter moves from its original position to allow the passage of air from orifice 26 of pipe 19 to orifice 35 of envelope 18.

Calibrated elastic organ 36, located around axis 34 brings movable shutter 32 back to its original position when the wind speed is less than 3 m/s.

It is advantageous if the adjustment means for the tension of elastic organ 36 can be connected to axis 34 to allow for the adjustment of the wind speed at which the movable shutter moves away from its original position.

Chimney 33 ensures the ventilation of the terminal when the wind speed is less than 3 m/s. This chimney comprises tubular element 33 topped with cap 37. The base of the tubular element is connected to envelope 18 around an orifice located in the envelope. Cap 37 is held apart from the tubular element by struts.

The cap is made of or is coated with a material which absorbs solar radiation or, more particularly, heat rays, so as to cause an increase in the temperature inside the chimney to create a forced air circulation inside the terminal. This air circulation flows from orifice 26 of pipe 19 to chimney 33.

It is to be understood that the arrangements described above have as their goal the avoidance of all variation in temperature within terminal 13.

According to another embodiment of the invention (not shown), the ventilation system can comprise a ventilator driven by an electric motor. These two elements can be located in envelope 18 behind one or more means 20.

Figure 5:
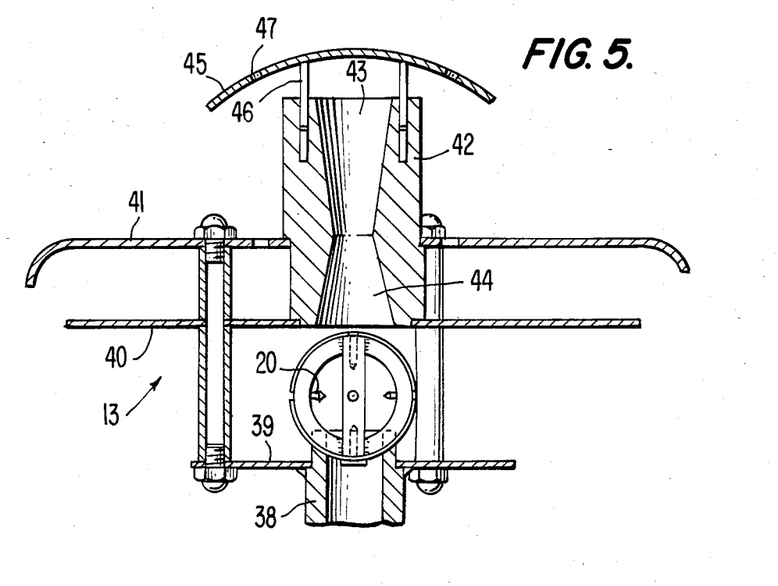
FIG. 5 is a cross-section of another embodiment of a thermodifferential.
Figure 6:
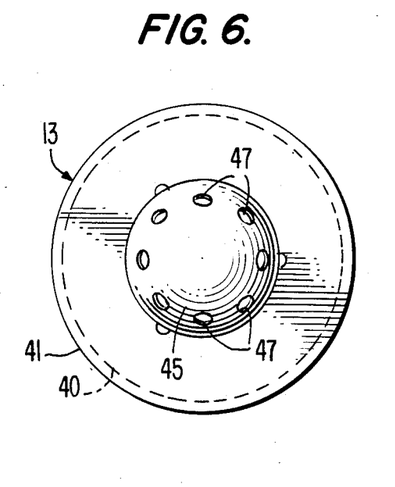
FIG. 6 is a top view according to FIG. 5.

Yet another embodiment of the invention is shown in FIGS. 5 and 6. In this embodiment the terminals are stationary in relation to the cross bar of chassis 7 which supports them.

As can be seen, each terminal comprises vertical base 38 supporting at least one of temperature recording means 20, horizontal platform 39 connected to the base, at least two discs 40 and 41 supported by the platform, and ventilation system 42 above temperature recording means 20. Base 38 comprises a tubular element attached by its lower end to one of the cross bars of the chassis. Temperature recording means 20 of the type described above are located on rings 30.

The upper end of base 38 is shouldered so as to receive platform 39. Platform 39 is in the shape of a disc having a central orifice engaged around base 38 against the shouldering. As can be seen in FIG. 5, platform 39 is located under temperature recording means 20.

Discs 40 and 41, which are horizontal and coaxial to base 38, are held apart from each other and from platform 39 by vertical struts which are angularly disposed. These struts are equipped with a median orifice of passage of one attachment means of discs 40 and 41, one in relation to the other, and in relation to platform 39.

Disc 40 has a larger diameter than platform 39 and is located above temperature recording means 20, and defines with the said platform a space open to the four winds. Due to this fact, terminal 13 has no further need to be oriented along the direction of the wind for the recording of the temperature measurement. As stated above, means 20 are located on two rings perpendicular to each other so that the wind direction has no influence on the recording of the temperature measurement.

Disc 41 is of a greater diameter than disc 40 and is made of a material which reflects solar radiation. Preferably, disc 41 is made of polished stainless steel.

The peripheral border of disc 41 is curved downwardly to protect disc 40 from solar radiation, especially from heat radiation.

The diameter of discs 40 and 41, and of platform 39 are such that elements 40, 41 and 39 are inscribed in a cone whose angle at the apex is equal to at least 90°.

The ventilation system of the terminal comprises vertical chimney 42 engaged at its lower end in two orifices, each located in the center of discs 40 and 41. This chimney is in the shape of a cylindrical element pierced with two conical orifices 43 and 44, which are coaxial and open toward each of the ends. Advantageously, the chimney is made of a synthetic material, as for example, "TEFLON TM".

The upper section of the chimney has cap 45 in the shape of a cup. This cap is held apart from the upper section of the chimney by at least three cylindrical struts 46 attached to the cap, and each engaged in the smooth orifices located in the chimney parallel to its axis.

Cap 45 is covered with, or is made of, a material which absorbs solar radiation, and more precisely calorific radiation. This absorption causes an elevation of air temperature in the chimney which is able to ensure ventilation therein in the absence of wind.

Advantageously, cap 45 is pierced with a series of transverse orifices 47 to facilitate the removal of heated air in the chimney.

As previously stated, means 20 of the two terminals are connected to measure the variation of the temperature between the level ZO and the level ZO+ΔZ.

To measure the variation of dry and wet bulb temperatures of two levels ZO and ZO+ΔZ, above the plant cover, the apparatus of the invention further comprises two sets of at least two psychrometer terminals 48 located on chassis 7 as described in French Pat. No. 79 17306 (now French Pat. No. 2,460,475), the disclosure of which is incorporated herein by reference.

According to that patent, the two sets of psychrometers are connected to a device which periodically inverts the position of the sets of psychrometers, that is, one of the sets passes from the level ZO to the level ZO+ΔZ, while the other passes simultaneously from the level ZO+ΔZ to the level ZO. This arrangement allows for reduction of the percentage of errors in the recording of the dry and wet bulb temperature measurements at these two levels.

Figure 7A:
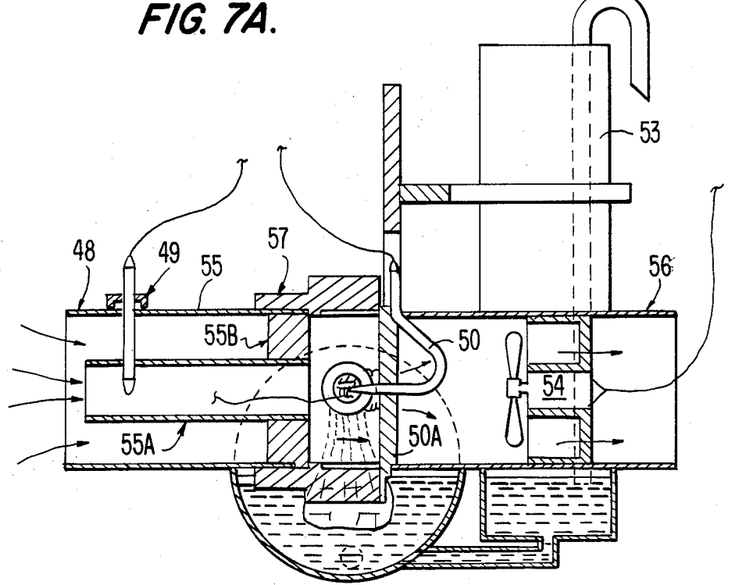
FIG. 7a is a cross-section of a psychrometer.

As is known to those skilled in the art, each psychrometer 48 is in the shape of a cylindrical element open on its two ends. Each psychrometer comprises sensor 49 for measuring the dry temperature Ta, sensor 50 for measuring the wet bulb temperature Th. Sensor 50 is connected with a moistening apparatus comprising a wick soaking in the water of two lateral reservoirs 52, each of which is equipped with a cover, and each of which is fed by reservoir 53. The psychrometer is also equipped with a ventilation system comprising electric ventilator 54 located in the back section to ensure the circulation of air from front to back.

As can be seen in FIG. 7a, the cylindrical body of the psychrometer comprises two coaxial tubular elements 55 and 56 of basically the same diameter. These elements are connected to each other by cylindrical ring 57.

Element 55 is advantageously covered by materials such as polished stainless steel. These materials will reflect solar radiation so as to avoid any variation in the temperature caused by a tightening effect inside the psychrometer, at the level of the dry and moist temperature probes.

This feature is reinforced by the addition in the tubular element 55 of a second tubular element 55A for capturing the air located in the front of the wet bulb temperature probe. Element 55A is also equipped with a radial orifice to receive the tip of sensor 49.

As can be seen in FIG. 7a, tubular element 55A is coaxial to element 55 and is recessed from the front of the psychrometer to avoid being hit by solar radiation. Tubular element 55A engages near wet bulb temperature probe 50 and the transverse and median orifice of ring 55B fits into ring 57, which holds it apart from element 55.

It is preferable that ring 55B be made of synthetic material and that it have a series of transverse, concentric orifices 55C for ventilation of the space between element 55 and element 55A.

As is known to those skilled in the art, the air sucked into tubular element 55A by ventilator 54 does not undergo any thermal variation because it is insulated in tubular element 55A by the layer of air located between elements 55 and 55A. It must also be noted that this layer of air is constantly renewed by suction through orifices 55C by ventilator 54. This assembly leads to a very precise dry and moist temperature measurement recording.

The annular edge of ring 57 directed towards the back of the psychrometer is hollowed out according to one of the diameters of a groove whose function will be explained below.

Tubular element 56 at the level of its interface with the ring 57 has two grooves located along a diametrical plane chosen during the assembly of element 56. The grooves are located on ring 57 across from the grooves previously described so as to form a housing intended to receive support 50A of probe 50.

Figure 7B:
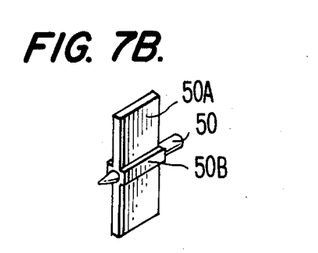
FIG. 7b is a perspective view of a support of a wet bulb temperature probe of a psychrometer.

As can be seen from the perspective of FIG. 7b, support 50A is parallelepipedic in shape and is equipped in its median section with overthickness 50B pierced with a transverse orifice following the direction of the length of this overthickness to receive the point of probe 50.

As can be seen in FIG. 7a, support 50A cooperates through its ends with each of the grooves and slots located respectively in ring 57 and tubular element 56. The support is positioned such that the orifice of the overthickness is coaxial to tubular element 55A, such that the point of probe 50 is located across from tubular element 55A.

Probe 50 is bent in a circular arc so that its heel is located parallel to support 50A. It can, therefore, engage in one of the grooves or slots described above. It is preferable that the point of probe 50 be covered with a sock made of fabric able to draw the water of the wick, as shown in FIG. 7a.

Figure 8:
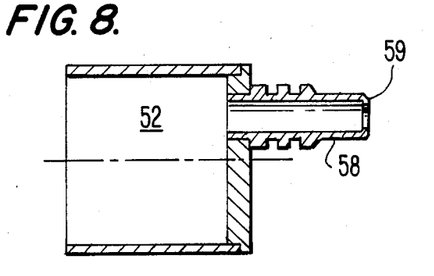
FIGS. 8, 9 and 10 are detailed views of the lateral reservoirs of a psychrometer.
Figure 9:
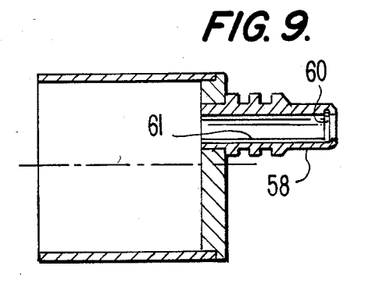
Figure 10:
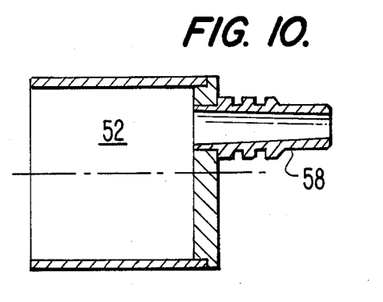

Ring 57 and element 56 are pierced along one of their diameters with two orifices to allow the passage of water from the wick perpendicularly to the housing of support 50A. These orifices, having diameters greater than the wick, each receive it, so that it is wedged as a cylindrical tubular projection 58 in the bottom of each of reservoirs 52, as shown in FIGS. 8-10. In these projections are engaged the wick, which soaks up the water of the reservoir and draws the water. Tubular projection 58 may be made by machine finishing, or by any other method known to those skilled in the art.

Projection 58 of each reservoir, as shown in FIGS. 8-10, is equipped with a means to prevent too great a flux of water in wick 51, and to prevent dripping, which can occur in the principal canal of the psychrometer, i.e., tubular body 55A. For this reason, projection 58 is lengthened so as to surround wick 51 until it is near probe 50 and the air current caused by ventilation system 54.

This extension or lengthening can be obtained either by the manufacture of projection 58 of greater length (see FIGS. 8-10), or by means of a set-in nozzle.

The end of the nozzle or projection 58 near the probe has an organ which the functions to moderate the quantity of water pumped by wick 51. This organ, as represented in FIGS. 8 and 9, can comprise an element which constricts, and is preferably circular and is on the end of the nozzle or the projection. The element which constricts has a smaller diameter than wick 51, which is compressable. It draws the wick 51 closer to probe 50. Due to this, part of the water pumped by wick 51 is held at a level of this constriction element and is returned to reservoir 52. This configuration of elements allows for a perceptable improvement of the measurements obtained.

The constriction element can be made by any means known to those skilled in the art. Embodiments thereof are represented in partial view in FIGS. 8-10.

the constriction can be achieved through an inside band 59, preferably on the edge of the end of the nozzle or on projection 58 (FIG. 8). It can also be obtained, as can be seen in FIG. 10, by giving the orifice of nozzle 58 a diminishing conical form, preferably from the reservoir to the free end of the nozzle or projection.

As seen in FIG. 9, the organ for limiting the quantity of water pumped comprises a circular groove 60 located in the inside wall of the nozzle in projection 58, in contact with groove 61 located in the inside wall parallel to the access of the nozzle or projection which allows the water to return to the reservoir.

Figure 11:
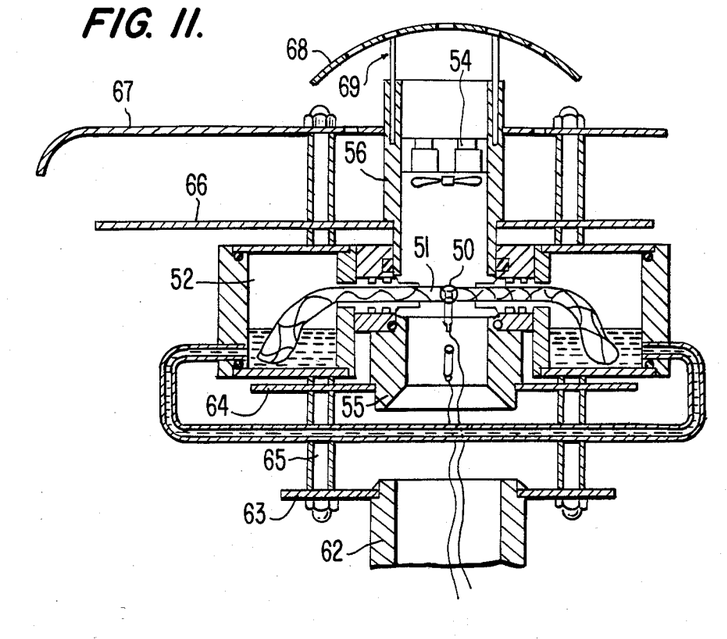
FIG. 11 is a cross-section of a psychrometer equipped with a means for protecting its lateral reservoirs.

According to yet another embodiment of the invention represented in FIG. 11, psychrometer 48 is vertically positioned and has at least one means for protecting the lateral reservoirs so as to avoid heating of the water contained therein. Preferably, as can be seen in FIG. 11, element 55 of the psychrometer is directed downwardly.

The psychrometer according to this embodiment is located on a base comprising vertical tubular element 62 connected to an inversion apparatus, horizontal platform 63 integrated with the top end of element 62 and horizontal disk 64 connected to the platform, and held apart from the platform by at least three vertical struts 65.

Disk 64 is positioned below lateral reservoirs 52. The median part of disk 64 is pierced with a transverse, circular orifice, so as to receive the free end of tubular element 55 of the psychrometer. This end is shouldered so as to block against disk 64 and to be held apart from platform 63 and element 62 so as to allow for the free passage of air.

According to a preferred embodiment, the psychrometer has two means 66 and 67 for protecting lateral reservoirs 52, each of these means comprising a disk. These horizontal disks are pierced with a median orifice in order to position themselves around tubular element 56 of the psychrometer, above lateral reservoirs 52. A set of vertical struts 65 allows the separation of disk 67 from disk 66.

Disks 64, 66 and 67 on platform 63 are blocked, one in relation to the other, by attachment organs engaged in the struts and in the orifices located in the disks and in the platform.

Disk 67 has a larger diameter than disk 66, and has an edge curved downward to protect disk 66 from calorific solar radiation. Moreover, disk 67 is made of a material which reflects solar radiation in order to prevent a variation of the temperature by a pressure build up in the layer of air found between disks 66 and 67.

It is preferable that disks 66, 67 and 64 inscribe themselves in a cone wherein the angle at the appex is equal to or greater than 90 degrees.

Tubular element 56 has a cap 68 on top of it. Cap 68 is supported by struts 69 engaged in the smooth orifices of tubular element 56, so as to protect the psychrometer, especially the ventilator and probes 49 and 50, from atmospheric influences.

It is preferable that the cap be in the shape of a cup, and be made of a material which absorbs solar radiation, thus facilitating ventilation.

Figure 12:
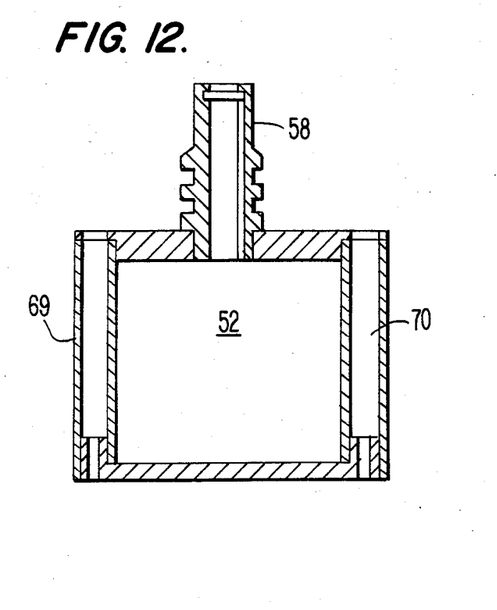
FIG. 12 is a cross-section of an embodiment of a lateral reservoir.

To protect lateral reservoirs 52 from solar radiation, it is desirable, as shown in FIG. 12, to enclose them in a shell 69 of polished stainless steel, or another suitable material. It is preferable that the shell be in the shape of a tubular element, wherein the diameter is greater than that of reservoir 52, so as to form with the reservoir annular chamber 70. Shell 69 is positioned around the reservoir's cover, thus ensuring that it is held in place.

The transverse orifices are pierced in the reservoir's cover to ensure the circulation of air in annular chamber 70. This chamber is open, as can be seen at the level of the bottom of the reservoir.

The arrangements previously described avoid any variation in the temperature of the water contained in the lateral reservoirs. Any such variation would, of course, result in an incorrect measurement of the wet bulb temperature Th by the probe 50.

Figure 13:
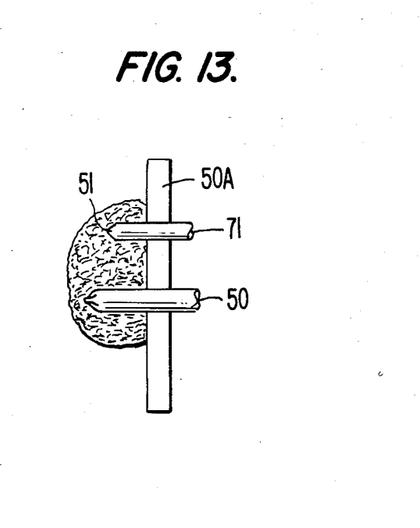
FIG. 13 is a partial cross-section showing the assemblage of the probe for measuring the temperature of the water in the wick.

In order to monitor the temperature of the water contained in reservoirs 52, with or without solar protection, probe 71 can be placed in each of the reservoirs, as shown in FIG. 13. The temperature indicated by probe 71 is compared to that measured by probe 50 for the dry temperature Ta. The comparison is made by the unit 2, which can correct the value of the wet bulb temperature.

According to yet another embodiment, as seen in FIG. 13, probe 71 is located in wick 51, as close as possible to second probe 50, so as to improve the measurement of the wet bulb temperature Th.

Moreover, as shown in FIG. 13, the points of probes 50 and 71 can be positioned in a sock of textile fiber able to pump water.

The various embodiments of the psychrometer as described above are, of course, to be located in duplicate in the inversion apparatus as seen in FIG. 1. That apparatus is equipped with two sets of two psychrometers, but each set can have just one psychrometer equipped with several probes for the dry temperature and several probes for the wet bulb temperature.

Figure 14:
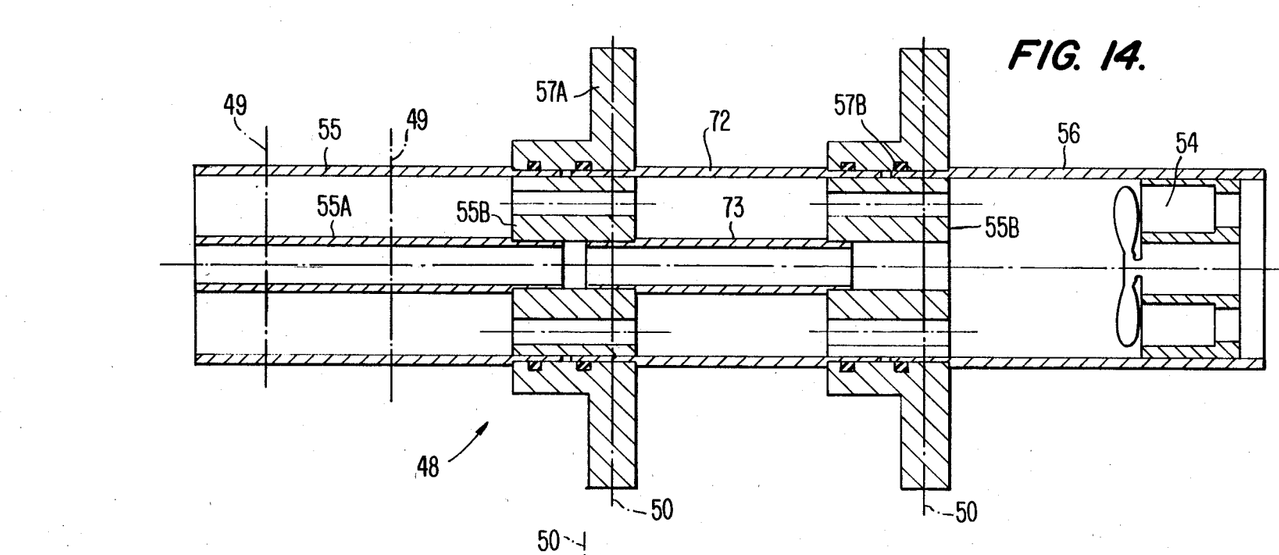
FIG. 14 is a cross-section of another embodiment of the psychrometer.

In FIG. 14, a psychrometer equipped with two probes for the dry temperature and two probes for the wet bulb temperature is represented. According to this embodiment, the psychrometer has two rings 57A and 57B each receiving one probe 50 and one moisting apparatus. Element 55, element 55A, and ring 55B are associated with ring 57A, as described above. Ring 55B, element 56, and ventilator 54 are associated with ring 57B.

Rings 57A and 57B are joined by tubular element 72 of a diameter basically equal to the diameter of element 55 or 56, and having the same characteristics as these elements. Rings 55B are joined by tubular element 73.

The ends of tubular elements 72 and 73 at the level of the ring 57A are equipped with slots to allow for the presence of the support of the probe and for the wick.

Figure 15:
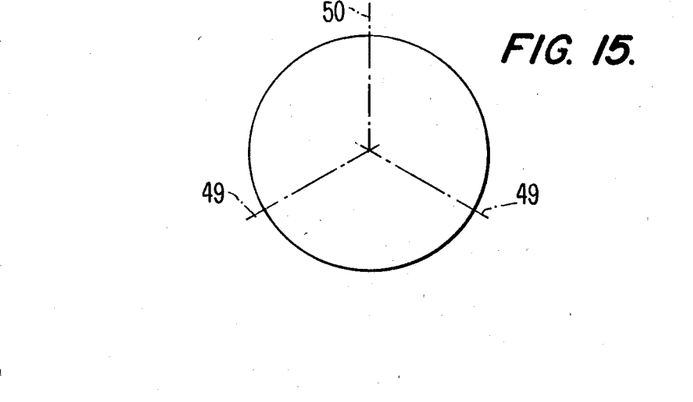
FIG. 15 is a schematic view showing the placement of the probes inside the psychrometer according to FIG. 14.

As represented in FIG. 15, the probes for wet bulb temperature 50 are positioned according to the same plane, diametrical to the psychrometer.

The probes for dry temperature, located radially in the element 55A, are positioned according to two planes diametrical to the psychrometer.

As can be seen in FIG. 15, the plane of probes 50 and the plane of probes 49, are angularly altered in a regular fashion.

The psychrometer according to this embodiment can receive two lateral reservoirs for each ring 57A and 57B or can receive one reservoir equipped with two nozzles or projections, each engaged in the orifice of a ring.

It is evident that the psychrometer as described above can be equipped with a greater number of probes, being merely a function of the number of rings similar to 57A and 57B, and of elements 72 and 73.

According to yet another embodiment not represented here, the psychrometer can be equipped with two probes for the dry temperature and with two probes for the wet bulb temperature, these latter two located on the same diametrical plane.

Referring again to FIG. 1, on frame 1, there are also attached two air terminals 74 for measuring the variation of the amount of carbon dioxide between the two levels Z1 and Z2, located respectively under the level ZO and between the levels ZO and ZO+$\Delta$Z.

It is preferable that the air terminals be each attached to a horizontal arm equipped with a strap and attached in a detachable manner to one of the wires 4 of frame 1.

An analyzer of the rate of $CO_2$ change and an inversion system commanded by the unit 2 are associated with these two terminals. Each terminal is connected to the inversion system by a flexible pipe.

The inversion system, comprising as for example, an electro-gate, has as its goal to allow communication between terminals 74 and the $CO_2$ analyzer by means of its pipes. The analyzer delivers a signal or tension representative of the amount of carbon dioxide to the unit 2.

The value of net radiation necessary for the calculation of the evapotranspiration is measured, as is already known to those skilled in the art, by a pyradiometer 75 equipped with a horizontal attachment arm, on one of the wires 4 of the frame 1, or on an independent frame 76, as represented in FIG. 1. To position the pyradiometer at the level of ZO, its arm ends are placed in an attachment strap able to slide on the frame and be blocked on the frame.

The apparatus of the invention is also equipped with at least one fluxmeter 77 for measuring the value of the conduction flux in the soil. This fluxmeter is of a known type, and is buried at a depth of two centimeters in the ground around the plant cover.

The apparatus of the invention is further equipped with means to measure a reference temperature T0, advantageously that of the ground at a depth of at least one meter.

The means for measuring the temperature T0, such as a probe or other means, is located in a plastic block buried in the ground at the depth previously indicated.

For the calculation of the evapotranspiration, it is necessary to known both the variation between the reference temperature T0 and the earth temperature T1, at the ground surface of the plant cover.

To this end, the measuring means T0 and T1 are joined in such a way as to directly give the variation between these two temperatures. As previously described, these means can comprise thermo-couple network 78.

On one side of the thermo-couple network, approximately six thermo-couples are placed in the plastic block, while on the other side above the ground surface, six thermo-couples are located in a naturally ventilated air intake which is oriented towards the eye of the wind, as previously described for terminals 13.

Moreover, the six thermo-couples of the ventilated intake are distributed according to a double structure which is semi-circular, comprising as stated earlier, two crossed rings.

The apparatus are further equipped with means 79 for measuring the variation between the reference temperature T0 and the ground surface temperature. This means comprises a thermo-couple network wherein one side is located in a plastic block buried in the ground at a depth of one meter, and wherein the other side comprises several thermo-couples which are distributed on the ground around the plant cover.

In order to determine the hydrous state of the ground compared to the quantity of water received and the quantity of water which has evaporated, the apparatus is equipped with rain gauge 80 connected to a means of measuring the quantity of water collected.

The various terminals previously described transmit the information to the command and calculation unit 2.

Figures 16, 17:
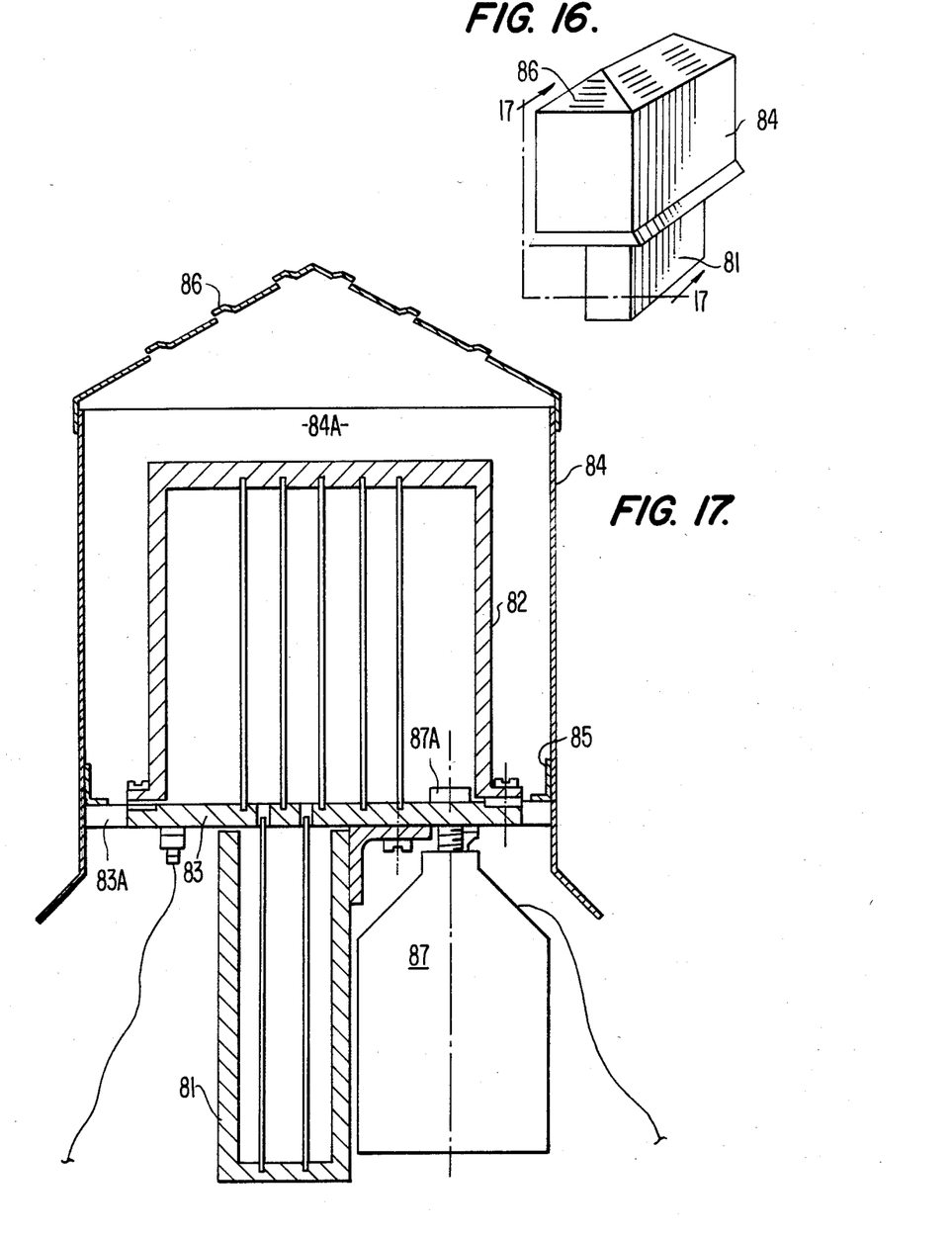
FIG. 16 is a perspective view of the unit housing.
FIG. 17 is a cross-sectional view according to line 17—17 of FIG. 16.

As can be seen in FIGS. 16 and 17, lower box 81 is parallelepiped in shape, and is attached in a manner known to those skilled in the art to the lower side of solid horizontal platform 83 of the upper crust bar of inverted chassis 7.

It is advantageous if box 81 is made of a material which is corrosion proof and is able to reflect the calorific rays of the sun, so as to avoid disturbing the operation of the electronic apparatus. According to a preferred embodiment, box 82 in FIG. 17 is made of stainless steel, which protects it from corrosion.

An impervious joint is positioned between platform 83 and the edge of the box 81 to avoid the introduction of dust and humidity from the air.

Upper box 82 is attached in a way known to those skilled in the art to the upper side of platform 83 with the intervention of an impervious joint for the reasons previously stated.

Envelope 84 is located around box 82 to form with the box chamber 84A. This envelope is made of material which reflects solar radiation and is equipped with angle-irons 85 for attachment in the lower section and inside of the edge of the platform. The upper section is shaped like a roof, and is equipped with cable suspension means 8, as can be seen in FIG. 1.

Openings 86 located in the upper part of the envelope and slots 83A located in the border of the platform ensure the ventilation of chamber 84A, so as to avoid any temperature variation in the chamber and in box 82 by the effect of pressure build-up.

It is desirable that the lower section of the vertical walls of the envelope be held apart from the platform so as to facilitate the introduction of air in chamber 84A.

The temperature inside boxes 81 and 82 can, if necessary, be adjusted by the introduction of a low temperature gas. This gas, in a liquid state, can be contained in reservoir 87 cooperating with valve 87A, which is furnished with an anti-return valve located in an orifice of the platform. The gas is first introduced into box 82 and then into box 81 through one or several communication orifices located in platform 83.

To eliminate water condensation in the boxes, platform 83 receives a second valve equipped with an anti-return valve which cooperates with a reservoir containing a silicon gel.

Figure 18:
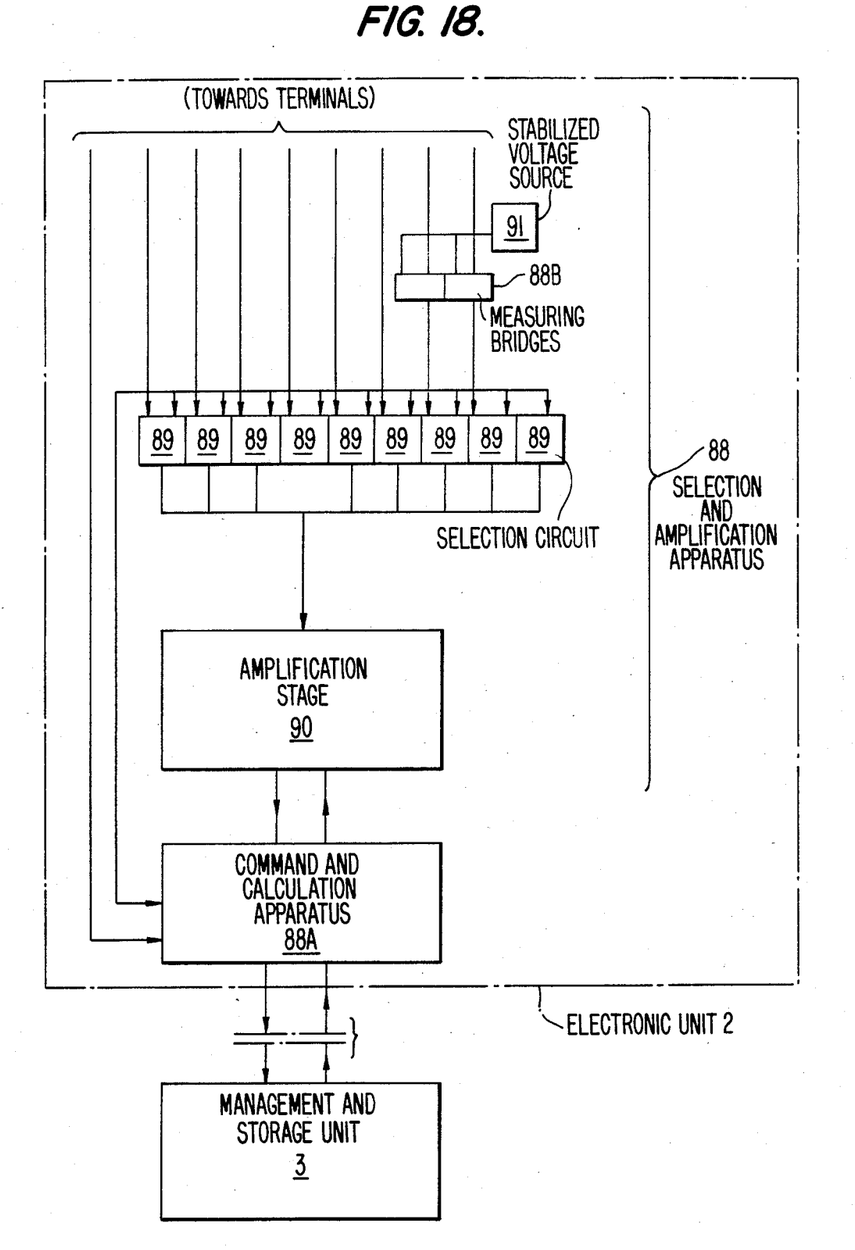
FIG. 18 is a schematic diagram of the selection and amplification apparatus, the command and calculation apparatus and the management and storage unit.

As shown in FIG. 18, electronic unit 2 comprises a feeder located in housing 81 of FIG. 16, selection and amplification apparatus 88 for signals transmitted by the terminals, and command and calculation apparatus 88A.

As can be seen in FIG. 18, the selection and amplification apparatus 88 comprises selection circuits for the signals delivered by the terminals, several measuring bridges 88B, each connected with a probe for psychrometers, and at least one amplification stage 90 for signals delivered by the terminals or by the measuring bridges.

Each selection circuit 89 commanded by apparatus 88 has as its goal to establish communication between one of the apparatus' entrances 88, each of which is affected at one of the apparatus' terminals or at the exit of the measuring bridges and of amplification stage 90.

The selection circuits are preferably relays having mercury contactors to ensure good galvanic connection.

These relays as shown in FIG. 18 are each operated by a transistor coupled by a resistance to apparatus 88A.

The measuring bridges are fed by a stabilized voltage source 91 comprising precision resistances having small tolerance on the order of + or −1 ppm.

The measuring bridges, as is known to those skilled in the art, each comprise a variable resistance, to allow for adjustments.

Each measuring bridge delivers a voltage representative of the variation between the dry and wet bulb temperatures measured by the psychrometers, or by the variation of the air temperature at the two levels, as measured by the thermodifferentials in the event that they are equipped with probes, or by the reference temperature or the air temperature at the ground level or on the ground surface.

Amplification stage 90 receives and amplifies the signals delivered by the terminals or by the measuring bridges to a greater or lesser degree. To this end, according to one embodiment, the amplication stage comprises two or more amplifiers each directed to the amplification of signals emanating from one or more terminals or one or more bridges.

In this case, the relays select the input (terminal) or the bridge and the amplifier which is to receive the signals emanating from the input (terminal) or from the bridge.

According to yet another embodiment, the amplification stage comprises an amplifier with a programmable amplification factor, which is adjusted by the apparatus 88A.

The input of the amplification stage or of one of the amplifiers of the stage is regularly short circuited by the contacts of one of relay stations 89 to allow, as a function of zero of the stage or of the amplifier, the correction of the amplified value by the apparatus 88A.

The amplification stage transmits the amplified signals to the electronic apparatus 88A. This apparatus has as its goal to command the periodic inversion of the psychrometers, the inversion of the arrival of the carbon dioxide in the analyzer, and to act on relay stations 89 in order to select the inputs of the apparatus 88A or the outputs of the measuring bridges, as well as to treat the transmitted signals, and to calculate the evapotranspiration and its various terms, and to transmit this information to acquisition (management and storage) unit 3.

To this end, the apparatus 88A can comprise a microprocessor connected to at least one live memory and to at least two dead memories, and an address selector.

The command of inversion for the psychrometers and the command of the electro-gate of the $CO_2$ analyzer are effected by the intermediary of a parallel liaison circuit (PIA), and at least one power circuit.

This PIA also commands the multiplexing of relay stations 89 and communicates with a digital to analog converter which receives signals issuing from the amplification stage.

The frequency signals transmitted by the anemometers are processed by a programmable timer organized into two frequency terminals to process the signals issuing from the two anemometers, and into a one minute time generator. By way of non-limiting example, the timer can be an integrated circuit of the 6840 type.

Evapotranspiration and its various terms are calculated by the microprocessor according to the program stored in its memory.

The calculation is effected sequentially. Except for a fraction of the determined time limit, there can be several calculations for the evapotranspiration and its various terms.

Moreover, apparatus 88A can calculate for a fraction of time diminished by the mean of these different values.

By means of the addition of the rain gauge, apparatus 88A will be in a position to indicate sequentially the hydrous state of the soil. The apparatus 88A should also take into consideration the adjustment constants of the various terminals for the calculation of the evapotranspiration and its various terms.

The program and the constants or adjustment curves are introduced into the memories of apparatus 88A by a keyboard of unit 3 and by a liaison organ (series ACIA) for apparatus 88A.

After calculation, the values of the evapotranspiration and of its various terms are transmitted to storage unit 3 by ACIA and by a baud or modem generator.

The storage unit comprises several memories run by microprocessors in which are stored the facts received by a modem and the calculation programs for the evapotranspiration.

As stated previously, the evapotranspiration and its various terms can be calculated by three methods: the Bowen ratio method, the simplified combined aerodynamic method and the simplified direct aerodynamic method.

The chosen program for one of these three methods is loaded in the memories of the apparatus 88A by means of a keyboard.

It should also be noted that the memories of the unit 3 can receive several test programs to control the operation after the apparatus is set up. The unit 3 can be placed in a box which is buried and comprises an electronic compartment with double thick walls and a compartment receiving the various inputs, as is known in the art.

The apparatus as described here allows the calculation of evapotranspiration according to three methods, thereby rendering it adaptable to any measuring site.

Various changes or modifications may be made to the above-described invention without departing from the spirit and scope of the invention, as described in the claims that follow.

I claim:

1. An apparatus for measuring the real evapotranspiration of a plant cover, comprising at least one thermodifferential terminal for measuring air temperature above said plant cover, wherein each of said at least one thermodifferential terminals comprises:
   (a) articulation means for articulating said at least one thermodifferential terminal around a vertical axis;
   (b) orientation means for orienting said at least one thermodifferential terminal relative to the eye of the wind;
   (c) a protective outside envelope for reflecting solar radiation from said at least one thermodifferential terminal;
   (d) at least one ventilation means for ventilating said thermodifferential terminal, said at least one ventilation means comprising an air entry pipe for admitting air into said at least one thermodifferential terminal, located in the front section of said envelope, and spaced from said envelope by spacing means;
   (e) thermal insulation means for thermally insulating said air entry pipe; and
   (f) at least one means for recording the air temperature measured by said thermodifferential terminal, wherein each of said at least one thermodifferential terminals is equipped with two protective horizontal and coaxial disks of different diameters for protecting said means for recording the temperature from solar radiation, said disks being located one above the other and above said means for recording the temperature, and held apart from each other by a set of struts connected to a horizontal platform for support.

2. The apparatus as defined by claim 1 wherein the upper disk has a diameter greater than that of the lower disk, and has a peripheral edge curved downwardly to protect said lower disk from solar radiation.

3. The apparatus as defined by claim 1 wherein said means for recording the temperature comprises a plurality of thermocouples directed toward a common point and wherein said plurality of thermocouples are regularly distributed in a spherical configuration.

4. The apparatus as defined by claim 3 wherein said means for recording the temperature is supported by a support comprising two rings having the same diameter and wherein said two rings are perpendicular to each other and inscribed in a same sphere and equipped with regularly distributed radial orifices for receiving said means for recording the temperature.

5. The apparatus as defined by claim 3 wherein each of said plurality of thermocouples comprises two elongate elements of different composition, and where said plurality of thermocouples are electrically connected and arranged in series, from a first thermodifferential terminal to a second thermodifferential terminal, to form an alternating set of two of said elements, for measuring the difference in temperature between said first and said second thermodifferential terminals.

6. The apparatus as defined by claim 1 wherein said ventilation means comprises a vertical chimney for ventilating said thermodifferential terminal located across from said means for recording the temperature, in orifices located in said disks.

7. The apparatus as defined by claim 6 wherein said vertical chimney is equipped with a cap able to absorb heat rays from the sun for creating pressure inside said chimney, to thereby cause circulation of an air current from said means for recording the temperature to the outside environment through said chimney.

8. The apparatus as defined by claim 1 wherein said ventilation means comprises a moveable shutter in said envelope behind said means for recording the temperature, said shutter adapted to be divided by an air current, said shutter being positioned in an original position where it obstructs a back orifice of said envelope, said ventilation system further comprising a chimney attached to said envelope between said means for recording the temperature and said shutter.

9. The apparatus as defined by claim 8 wherein said chimney is topped with a cap able to absorb solar radiation to create pressure inside said chimney to thereby cause circulation of an air current from said means for recording the temperature to the outside environment through said chimney.

10. An apparatus as defined by claim 1, wherein said disks and said platform are inscribed in a cone whose angle at the apex is equal to at least 90°.

11. An apparatus for measuring the real evapotranspiration of a plant cover, comprising at least one psychrometer and at least one means for ventilating said at least one psychrometer and wherein said at least one psychrometer comprises:
 (a) at least one first probe for measuring the dry bulb temperature, said at least one first probe located in a tubular element; and
 (b) at least one second probe for measuring the wet bulb temperature, said at least one second probe located in a ring connected to a moistening apparatus for moistening said at least one second probe, wherein said moistening apparatus comprises a wick for drawing water from two lateral reservoirs, each reservoir being equipped with a cylindrical, tubular projection engaged in an orifice in said ring and receiving said wick, wherein each projection is equipped with means to limit the quantity of water drawn by said wick, to avoid dripping of water into the principal channel of said psychrometer.

12. The apparatus as defined by claim 11 wherein said lateral reservoirs are each equipped with means for protection from solar radiation.

13. The apparatus as defined by claim 12 wherein the means for protection from solar radiation comprises a plurality of disks.

14. The apparatus as defined by claim 12 wherein the means for protection from solar radiation comprises a shell.

* * * * *

UNITED STATES PATENT AND TRADEMARK OFFICE
CERTIFICATE OF CORRECTION

PATENT NO. : 4,599,889
DATED : July 15, 1986
INVENTOR(S) : Christian CASTELLUCIO It is certified that error appears in the above-identified patent and that said Letters Patent is hereby corrected as shown below:

Column 1, line 14, the words "in situ" should appear in italic, or be underlined.

Column 3, line 51, the words "in situ" should appear in italic, or be underlined.

In column 8, line 10, change "of" to ---at--- before "two levels".

Column 10, line 4, change "the" to ---The---; and
column 10, line 56, insert a ---,--- after "a cone".

Column 12, line 45, change "known" to ---know--- after "necessary to".

Column 13, line 32, change "of" to ---at--- after "and inside".

Column 14, line 25, change "amplication" to ---amplification---.

Column 4, line 11, change "lengtened" to ---lengthened---.

Column 5, line 10, delete the "," after "with"; and
column 5, line 13, change "measure" to ---measurement---.

Column 6, line 42, change "articuated" to ---articulated---.

Column 9, line 57, delete "the" after "organ which"; and
column 9, line 67, change "perceptable" to ---perceptible---.

UNITED STATES PATENT AND TRADEMARK OFFICE
CERTIFICATE OF CORRECTION

PATENT NO. : 4,599,889

DATED : July 15, 1986

INVENTOR(S) : Christian Castellucio

It is certified that error appears in the above-identified patent and that said Letters Patent is hereby corrected as shown below:

Column 11, line 41, change "moisting" to ---moistening--- before "apparatus".

Signed and Sealed this

Twentieth Day of October, 1987

Attest:

DONALD J. QUIGG

Attesting Officer

Commissioner of Patents and Trademarks